United States Patent
Rodgers et al.

(10) Patent No.: US 11,347,486 B2
(45) Date of Patent: May 31, 2022

(54) COMPILER-INITIATED TILE REPLACEMENT TO ENABLE HARDWARE ACCELERATION RESOURCES

(71) Applicant: ADVANCED MICRO DEVICES, INC., Santa Clara, CA (US)

(72) Inventors: Gregory P. Rodgers, Austin, TX (US); Joseph L. Greathouse, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 71 days.

(21) Appl. No.: 16/832,275

(22) Filed: Mar. 27, 2020

(65) Prior Publication Data
US 2021/0303284 A1    Sep. 30, 2021

(51) Int. Cl.
*G06F 8/41* (2018.01)
*G06F 17/16* (2006.01)

(52) U.S. Cl.
CPC ............ *G06F 8/4435* (2013.01); *G06F 17/16* (2013.01)

(58) Field of Classification Search
CPC ........ G06F 8/452; G06F 8/443; G06F 8/4434; G06F 8/4435; G06F 17/16
See application file for complete search history.

(56) References Cited

U.S. PATENT DOCUMENTS

| | | | |
|---|---|---|---|
| 8,336,036 B2 | 12/2012 | Kim et al. | |
| 8,789,026 B2 | 7/2014 | Auerbach et al. | |
| 10,032,110 B2 | 7/2018 | Young et al. | |
| 2007/0169059 A1 | 7/2007 | Halambi et al. | |
| 2017/0200094 A1 | 7/2017 | Bruestle et al. | |
| 2018/0107456 A1* | 4/2018 | Bruestle | G06F 17/12 |
| 2018/0157471 A1 | 6/2018 | Venkataramani et al. | |
| 2019/0179870 A1 | 6/2019 | Bannon et al. | |
| 2019/0325303 A1 | 10/2019 | Daga et al. | |
| 2019/0370631 A1 | 12/2019 | Fais et al. | |
| 2019/0392296 A1 | 12/2019 | Brady et al. | |
| 2021/0048991 A1* | 2/2021 | Tanner | G06F 8/4442 |

OTHER PUBLICATIONS

Zerrel et al. "Stripe: Tensor Compilation via the Nested Polyhedral Model", Mar. 18, 2019, retrieved from <https://arxiv.org/pdf/1903.06498.pdf>, total pages 13. (Year: 2019).*
J. Kim et al., "A Code Generator for High-Performance Tensor Contractions on GPUs," 2019 IEEE/ACM International Symposium on Code Generation and Optimization (CGO), 2019, pp. 85-95, doi: 10.1109/CGO.2019.8661182. (Year: 2019).*

(Continued)

*Primary Examiner* — Marina Lee

(57) ABSTRACT

A processing system includes a compiler that automatically identifies sequences of instructions of tileable source code that can be replaced with tensor operations. The compiler generates enhanced code that replaces the identified sequences of instructions with tensor operations that invoke a special-purpose hardware accelerator. By automatically replacing instructions with tensor operations that invoke the special-purpose hardware accelerator, the compiler makes the performance improvements achievable through the special-purpose hardware accelerator available to programmers using high-level programming languages.

19 Claims, 5 Drawing Sheets

(56) References Cited

OTHER PUBLICATIONS

Leback, Brent, "Bringing Tensor Cores to Standard Fortran", NVIDIA Developer, Aug. 7, 2020, 8 pages.

Gan, Ge, et al., "Tile Percolation: an OpenMP Tile Aware Parallelization Technique for the Cyclops-64 Multicore Processor", Euro-Par, 2009, 13 pages.

Gan, Ge et al., "Tile Percolation: an OpenMP Tile Aware Parallelization Technique for the Cyclops-64 Multicore Processor," European Conference on Parallel Processing, Lecture Notes in Computer Science, vol. 5704. Springer, Berlin, Heidelberg, pp. 839-850, University of Delaware, Newark, Delaware 19716, U.S.A., 2009, 13 pages.

International Search Report dated Jul. 20, 2021 for Application No. PCT/US2021/024154, 8 pages.

\* cited by examiner

COMPILER-INITIATED TILE REPLACEMENT TO ENABLE HARDWARE ACCELERATION RESOURCES

BACKGROUND

Modern processor applications often require relatively complex manipulation of vectors, matrices, and similar structures. For example, vector and matrix manipulation is useful in graphics operations, digital signal processing applications, machine learning, neural network applications, and the like. To enhance processing efficiency for these applications and operations, modern processing systems employ one or more general-purpose processors, such as a central processing unit (CPU), and one or more graphics processing units (GPUs) that include a special-purpose hardware accelerator (also referred to as a hardware accelerator or shader intrinsics), which is specialized hardware for specific types of processing for relatively large blocks of data, such as vector and matrix multiplications. Accordingly, the GPU can support graphics applications, as well as other operations that require vector and matrix manipulation.

In order to execute a function at the special-purpose hardware accelerator, the function must be invoked, or called, by an application program executing at the processing system CPUs. Accordingly, the programmer of the application program must include the function calls in the application program. Typically, the programmer must employ an application program interface (API) associated with the special-purpose hardware accelerator in order to ensure that the functions are properly called by the application program. For example, in some cases the programmer employs a kernel programming language such as Open Computing Language (OpenCL), Heterogeneous-Computing Interface for Portability (HIP), Vulkan, or the Compute Unified Device Architecture (CUDA) to properly invoke a function of the special-purpose hardware accelerator. However, such an API is usually complex, increasing the expertise and time required to prepare and debug the application program. For example, the APIs typically require the programmer to include, for each function call, supporting source code that ensures the corresponding function call is properly invoked and executed. This requires the programmer to have extensive knowledge of a potentially complex API, increasing programming and debug time.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
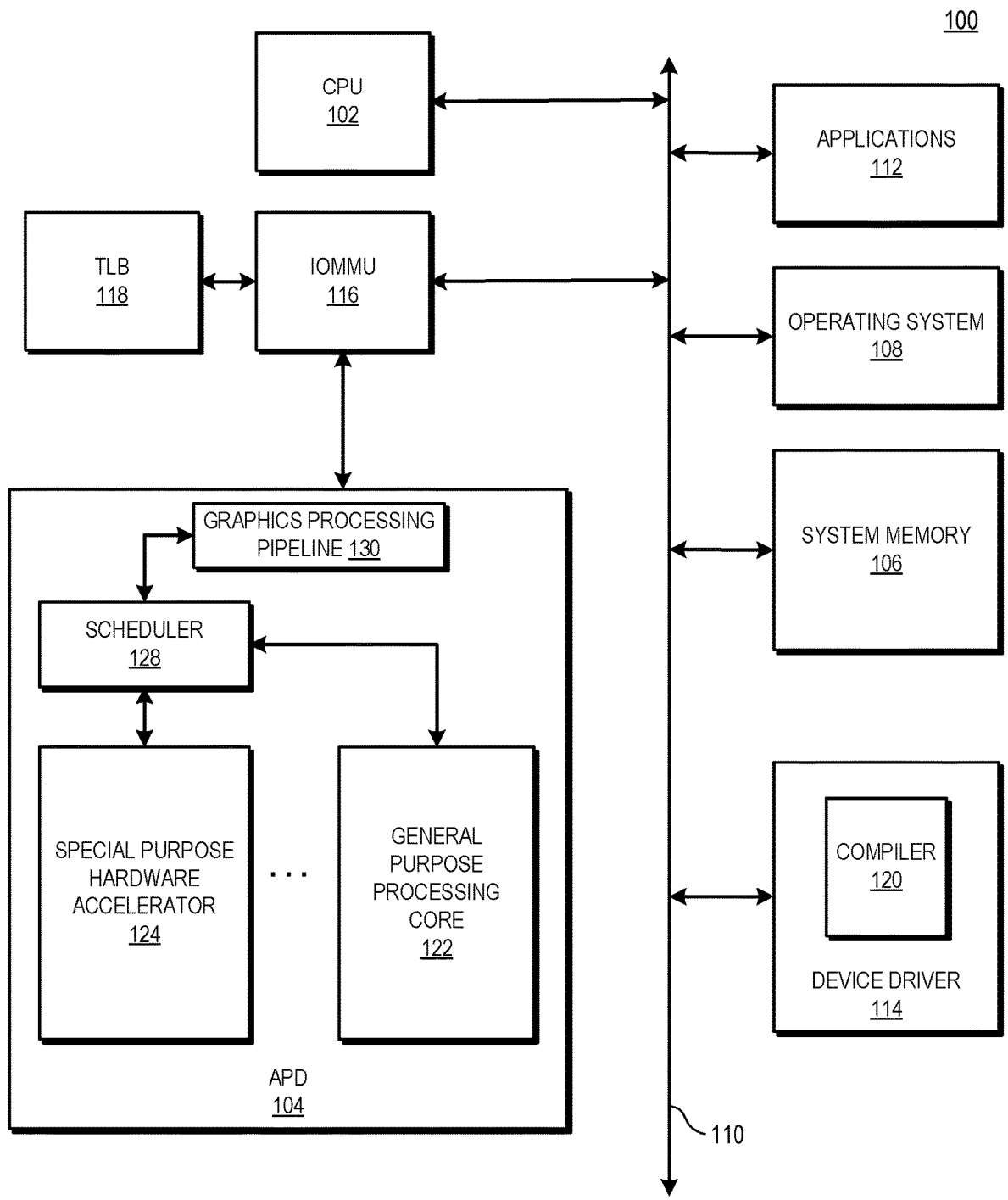
FIG. 1 is a block diagram of a processing system including a compiler that automatically identifies and replaces a portion of compiler-generated code for tiles of input source code that is identified as tileable with high-performance tensor operations to be executed at a special-purpose hardware accelerator in accordance with some embodiments.

A processing system includes a compiler that automatically identifies sequences of instructions of source code that will access blocks of memory, and that can be replaced with tensor operations that are executable by a special-purpose hardware accelerator of the processing system. A tensor operation is a vector or matrix operation such as a convolution or a general matrix to matrix multiplication (GEMM) commonly used in machine learning. The compiler generates enhanced code that replaces the identified sequences of instructions with tensor operations that invoke the special-purpose hardware accelerator. By automatically replacing instructions with tensor operations that invoke the special-purpose hardware accelerator, the compiler makes the performance improvements achievable through the special-purpose hardware accelerator available to programmers using high-level programming languages, without requiring specialized knowledge of low-level APIs.

In response to receiving an indication that a loop of source code is "tileable" (i.e., that indicates that particular functions will access memory in a block, or "tiled", manner), the compiler identifies inner loops of the tileable source code that match a set of tensor operations executable by a special-purpose hardware accelerator of the processing system. In response to identifying an inner loop that matches the dimensions and data type (i.e., single precision or double precision) of a tensor operation executable by the special-purpose hardware accelerator of the processing system, the compiler automatically replaces the inner loop with the matching tensor operation. In some embodiments, the compiler calls a component external to the compiler to determine whether a portion of compiler-generated code for a tile includes a sequence of instructions that can be replaced with a tensor operation and to replace the portion of the generated code for a tile with a tensor operation.

"Tile" constructs are used by programmers to indicate that particular source code functions will access memory in a tiled manner, thus allowing the compiler to generate optimized memory accesses and register blocking code. Loop tiling is a loop transformation that takes advantage of spatial and temporal locality of data accesses in loop nests. A tile loop transformation allows data to be accessed in blocks, or tiles, with the tile size defined as a parameter of the transformation. Each user-written loop is converted into a set of inner and outer loops. The tiles provide efficient memory accesses to blocks of data having specific sizes that are fixed at compile time and that are calculated based on data sizes and cache size.

To invoke a tile construct that will signal the compiler to generate optimized memory accesses, a programmer includes a pragma (e.g., "#pragma omp tile") indicating that a loop includes a tile having certain dimensions (referred to herein as an indication that a loop is "tileable"). In response to a pragma indicating that a loop is tileable, the compiler compares the inner loops of the tile to determine if any of the inner loops match the dimensions and data types of a set of tensor operations executable by a special-purpose hardware accelerator of the processing system. An inner loop that matches the dimensions and data type of a tensor operation executable by the special-purpose hardware accelerator of the processing system is referred to herein as a "perfect" tile. Inner loops of the tile that do not match the dimensions and data type of a tensor operation executable by the special-purpose hardware accelerator of the processing system are referred to herein as "imperfect" or "remainder" tiles. The compiler replaces perfect tiles with matching tensor operations, facilitating access to the special-purpose hardware accelerator that enhances processing performance, even while using high-level source code.

FIG. 1 is a block diagram of a processing system 100 in accordance with some embodiments. The processing system 100 includes a central processing unit (CPU) 102 and an accelerated processing device (APD) 104. In various embodiments, the CPU 102 includes one or more single- or multi-core CPUs. In various embodiments, the APD 104 includes any cooperating collection of hardware and/or software that perform functions and computations associated with accelerating graphics processing tasks, data parallel tasks, nested data parallel tasks in an accelerated manner with respect to resources such as conventional CPUs, conventional graphics processing units (GPUs), and combinations thereof. In the embodiment of FIG. 1, the processing system 100 is formed on a single silicon die or package that combines the CPU 102 and the APD 104 to provide a unified programming and execution environment. In other embodiments, the CPU 102 and the APD 104 are formed separately and mounted on the same or different substrates. In some embodiments, the processing system 100 additionally includes one or more input interfaces, non-volatile storage, one or more output interfaces, network interfaces, and one or more displays or display interfaces. The processing system 100 generally executes sets of instructions organized in the form of computer programs in order to carry out tasks on behalf of an electronic device. Accordingly, the processing system 100 can be used in any of a variety of electronic devices, such as a desktop or laptop computer, server, smartphone, tablet, game console, and the like.

As illustrated in FIG. 1, the processing system 100 also includes a system memory 106, an operating system 108, a communications infrastructure 110, and one or more applications 112. Access to system memory 106 is managed by a memory controller (not shown), which is coupled to memory 106. For example, requests from the CPU 102 or other devices for reading from or for writing to system memory 106 are managed by the memory controller. In some embodiments, the one or more applications 112 include various programs or commands to perform computations that are also executed at the CPU 102. The CPU 102 sends selected commands for processing at the APD 104. The operating system 108 and the communications infrastructure 110 are discussed in greater detail below. The processing system 100 further includes a device driver 114 and a memory management unit, such as an input/output memory management unit (IOMMU) 116. Components of the processing system 100 are implemented as hard-coded or programmable logic, one or more processors executing software/firmware instructions, or any combination thereof.

Within the processing system 100, the system memory 106 includes non-persistent memory, such as DRAM (not shown). In various embodiments, the system memory 106 stores processing logic instructions, constant values, variable values during execution of portions of applications or other processing logic, or other desired information. For example, parts of control logic to perform one or more operations on CPU 102 reside within system memory 106 during execution of the respective portions of the operation by CPU 102. During execution, respective applications, operating system functions, processing logic commands, and system software reside in system memory 106. Control logic commands that control the operating system 108 generally reside in system memory 106 during execution. In some embodiments, other software commands (e.g., device driver 114) also reside in system memory 106 during execution of processing system 100.

The IOMMU 116 is a multi-context memory management unit. As used herein, context is considered the environment within which the kernels execute and the domain in which synchronization and memory management is defined. The context includes a set of devices, the memory accessible to those devices, the corresponding memory properties, and one or more command-queues used to schedule execution of a kernel(s) or operations on memory objects. The IOMMU 116 includes logic to perform virtual to physical address translation for memory page access for devices, such as the APD 104. In some embodiments, the IOMMU 116 also includes, or has access to, a translation lookaside buffer (TLB) 118. The TLB 118, as an example, is implemented in a content addressable memory (CAM) to accelerate translation of logical (i.e., virtual) memory addresses to physical memory addresses for requests made by the APD 104 for data in system memory 106.

In various embodiments, the communications infrastructure 110 interconnects the components of processing system 100. Communications infrastructure 110 includes (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. In some embodiments, communications infrastructure 110 also includes an Ethernet network or any other suitable physical communications infrastructure that satisfies an application's data transfer rate requirements. Communications infrastructure 110 also includes the functionality to interconnect components, including components of processing system 100.

A driver, such as device driver 114, communicates with a device (e.g., CPU 102 and APD 104) through an interconnect or the communications infrastructure 110. When a calling program invokes a routine in the device driver 114, the device driver 114 issues commands to the device. Once the device sends data back to the driver device 114, the device driver 114 invoke routines in an original calling program. In general, device drivers are hardware-dependent and operating-system-specific to provide interrupt handling required for any necessary asynchronous time-dependent hardware interface. In some embodiments, a compiler 120 is embedded within device driver 114. The compiler 120 compiles source code into program instructions as needed for execution by the processing system 100. During such compilation, the compiler 120 applies transforms to program instructions at various phases of compilation. In other embodiments, the compiler 120 is a stand-alone application. In some embodiments, the compiler 120 is executed by the CPU 102 or APD 104 and the CPU 102 or APD 104 therefore executes the compiler 120 operations described herein.

The CPU 102 includes (not shown) one or more of a control processor, field programmable gate array (FPGA), application specific integrated circuit (ASIC), or digital signal processor (DSP). The CPU 102 executes at least a portion of the control logic that controls the operation of the processing system 100. For example, in various embodiments, the CPU 102 executes the operating system 108, the one or more applications 112, and the device driver 114. In some embodiments, the CPU 102 initiates and controls the execution of the one or more applications 112 by distributing the processing associated with one or more applications 112 across the CPU 102 and other processing resources, such as the APD 104.

The APD 104 executes commands and programs for selected functions, such as graphics operations and other operations that are particularly suited for parallel processing. In general, APD 104 is frequently used for executing graphics pipeline operations, such as pixel operations, geometric computations, and rendering an image to a display, or as a machine learning accelerator, dataflow engine, audio processor, and the like. In some embodiments, APD 104 also executes compute processing operations (e.g., those operations unrelated to graphics such as machine learning, video operations, physics simulations, computational fluid dynamics, etc.), based on commands or instructions received from the CPU 102. For example, some commands are considered special instructions that are not typically defined in the instruction set architecture (ISA) of the APD 104. A command can be executed by a special processor, such as a dispatch processor, command processor, or network controller.

In various embodiments, the APD 104 includes one or more compute units, such as one or more general-purpose processing cores 122 that include one or more single-instruction, multiple-data (SIMD) units (not shown) that execute a thread concurrently with execution of other threads in a wavefront, e.g., according to a SIMD execution model, and one or more hardware accelerators 124. The SIMD execution model is one in which multiple processing elements share a single program control flow unit and program counter and thus execute the same program but are able to execute that program with different data. Some embodiments of the APD 104 are used to implement a GPU and, in that case, the general-purpose processing cores 122 are referred to as shader cores or streaming multi-processors (SMXs). The number of general-purpose processing cores 122 that are implemented in the APD 104 is a matter of design choice.

Each of the one or more general-purpose processing cores 122 executes a respective instantiation of a particular work-item to process incoming data, where the basic unit of execution in the one or more general-purpose processing cores 122 is a work-item (e.g., a thread). Each work-item represents a single instantiation of, for example, a collection of parallel executions of a kernel invoked on a device by a command that is to be executed in parallel. A work-item can be executed by one or more processing elements as part of a work-group executing at a general-purpose processing core 122.

The APD 104 includes GPUs that issue and execute work-items including groups of threads executed simultaneously as a "wavefront" on a single SIMD unit. Multiple wavefronts are included in a "work group," which includes a collection of work-items designated to execute the same program. A work group is executed by executing each of the wavefronts that make up the work group. In some embodiments, the wavefronts are executed sequentially on a single SIMD unit or partially or fully in parallel on different SIMD units. In other embodiments, all wavefronts from a work-group are processed at the same general-purpose processing core 122. Wavefronts are also interchangeably referred to as warps, vectors, or threads. In some embodiments, wavefronts include instances of parallel execution of a shader program, where each wavefront includes multiple work-items that execute simultaneously on a single SIMD unit 124 in line with the SIMD paradigm (e.g., one instruction control unit executing the same stream of instructions with multiple data). A scheduler 126 performs operations related to scheduling various wavefronts on different processing cores 122 and SIMD units 124, as well as performing other operations for orchestrating various tasks on the APD 104.

The parallelism afforded by the one or more general-purpose processing cores 122 is suitable for graphics related operations such as pixel value calculations, vertex transformations, tessellation, geometry shading operations, and other graphics operations. A graphics processing pipeline 128 accepts graphics processing commands from the CPU 102 and thus provides computation tasks to the one or more general-purpose processing cores 122 for execution in parallel. Some graphics pipeline operations, such as pixel processing and other parallel computation operations, require that the same command stream or compute kernel be performed on streams or collections of input data elements. Respective instantiations of the same compute kernel are executed concurrently on multiple SIMD units in the one or more general-purpose processing cores 122 in order to process such data elements in parallel. As referred to herein, for example, a compute kernel is a function containing instructions declared in a program and executed on an APD general-purpose processing core 122. This function is also referred to as a kernel, a shader, a shader program, or a program.

Each general-purpose processing core 122 includes one or more processing elements such as scalar and/or vector floating-point units, arithmetic and logic units (ALUs), and the like. In various embodiments, the general-purpose processing cores 122 also include special-purpose processing units (not shown), such as inverse-square root units and sine/cosine units.

A work-item (e.g., thread) in a wavefront executes on a SIMD hardware lane (hereinafter referred to as a "SIMD lane") during its execution. In one embodiment, the processing elements of each SIMD unit are arranged into arrays that each includes sixteen lanes, where each lane executes the same instruction at the same time as the other lanes in the SIMD unit but can execute that instruction with different data and with each work-item mapped to a lane during execution. In some embodiments, a wavefront is a group of sixty-four threads (and thus each thread of the wavefront is assigned to a lane ranging from 0 to 63), which are issued in groups of sixteen threads through a sixteen-lane-wide SIMD unit over four cycles. However, those skilled in the art will recognize that the width of wavefronts and SIMD units include any configuration or number of threads (e.g., 8, 16, 32, 64, and the like) without departing from the scope of this disclosure.

Typical GPU programming languages are written from the perspective of a single thread. Some such languages allow specifying that a current thread should read a value from a specified different thread. In some embodiments, the source code is written such that the thread to be read from is computed from the current thread's ID. The APD 104 includes a special-purpose hardware accelerator 124 with functionality that accelerates certain patterns of thread data exchange. For example, data parallel primitive (DPP) functionality of the hardware accelerator 124 allows threads within a fixed-dimension wavefront to communicate with one another through their register files (i.e., it obviates the need to move data among lanes by allowing vector instructions to perform cross-lane reading at full throughput). In some embodiments the accelerator includes XDLOP functionality (invoked in response to corresponding XDLOP instructions) that allows threads of a wavefront to work together to perform matrix instructions with fixed dimensions. It is difficult to express fixed-dimension mechanisms such as DPPs and XDLOPs in programming models such as C, C++, FORTRAN, OpenCL, HIP, and CUDA, because programmers typically express algorithms in dimensions of an application domain such as a vector of dimension N or a matrix of dimension N by M. These application dimensions are typically larger than the fixed dimensions of DPP or XDLOP instructions. Furthermore, these application dimensions are not typically a multiple of the fixed dimensions. These differences make it difficult for the programmer to utilize a specific set of high-performance vector or matrix operations such as convolutions or general matrix to matrix multiplication operations (collectively, "tensor operations") of a special-purpose hardware accelerator 124.

Accordingly, the compiler 120 stores a set of tensor operations that can be executed at the special-purpose hardware accelerator 124 and identifies inner loops of source code that access memory in blocks for more efficient memory accesses (i.e., "tileable" source code) having sequences of instructions that can be replaced with one of the stored tensor operations. The compiler 120 replaces inner loops that match the dimensions and data types of stored tensor operations executable by the special-purpose hardware accelerator (i.e., "perfect" tiles) within the inner loops with tensor operations to generate enhanced code. The enhanced code invokes the hardware accelerator 124 to execute the tensor operations. thereby allowing access to high performance processing of the hardware accelerator 124 without requiring the use of low-level programming languages.

In some embodiments, during compilation, the compiler 120 generates wrapper code (not shown) for the kernels of the function calls for the source code. The wrapper code supports source code for each kernel by ensuring that the kernels are properly called and executed at the GPU. Accordingly, the wrapper code can include memory allocation instructions, data transfer instructions, variable and data structure declarations, and other code required by each kernel to be called and executed at the GPU. The compiler 120 generates the wrapper code by identifying and copying one or more source code templates for each identified kernel.

To illustrate via an example, in some embodiments an inner loop of tileable source code includes instructions for performing a convolution or a general matrix to matrix multiplication (GEMM). For example, if the compiler 120 compiles an inner loop of tileable source code that includes a sequence of instructions to multiply two single-precision 16×16 matrices, the compiler 120 searches the set of stored tensor operations executable at the special-purpose hardware accelerator 124. If the compiler 120 determines that a stored tensor operation is an aggregate instruction to perform a general matrix to matrix multiplication matching the dimensions (16×16) and data type (e.g. single precision) of the sequence of instructions, the compiler 120 generates enhanced code in which the sequence of instructions is replaced with the matching tensor operation. The compiler includes a wrapper in the enhanced code to invoke the special-purpose hardware accelerator 124 to execute the matching tensor operation, thereby exploiting the enhanced processing power of the special-purpose hardware accelerator 124.

Figure 2:
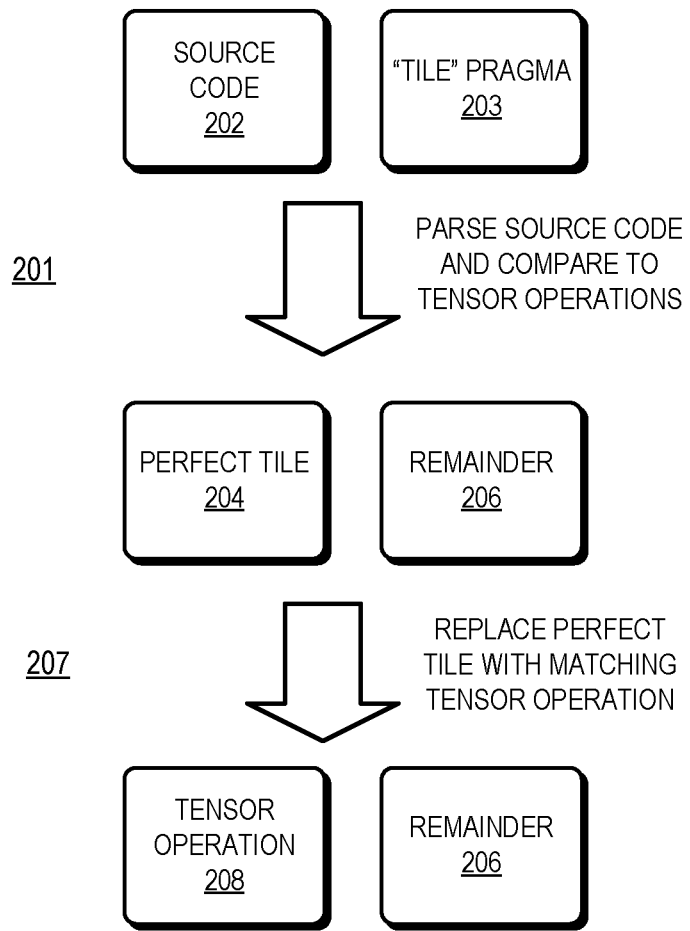
FIG. 2 is a block diagram illustrating operation of the compiler of FIG. 1 in accordance with some embodiments.

FIG. 2 illustrates an example operation of the compiler 120 of FIG. 1 in accordance with some embodiments. To invoke a tile construct that will signal the compiler to generate optimized memory accesses, a programmer includes a "tile" pragma 203 (e.g., "#pragma omp tile") indicating that a loop includes a tile having certain dimensions (referred to herein as an indication that a loop is "tileable"). At time 201, the compiler 120 parses source code 202 in response to receiving the tile pragma 203 indicating that the source code 202 is tileable. The compiler 120 compares sequences of instructions of the inner loops of the compiler-generated source code 202 to a set of tensor operations executable by the special-purpose hardware accelerator 124. The compiler 120 identifies each inner loop of the source code 202 that match the dimensions and data type of a tensor operation in the set as "perfect tile" 204. The compiler 120 identifies inner loops of the source code 202 that do not match the dimensions and data type of a tensor operation in the set as imperfect, or "remainder", tiles 206. At time 207 the compiler 120 replaces the perfect tile 204 with a tensor operation 208 to be executed at the special-purpose hardware accelerator 124 and leaves the remainder tiles 206 to be executed normally at the general-purpose processing core 122.

Figure 3:
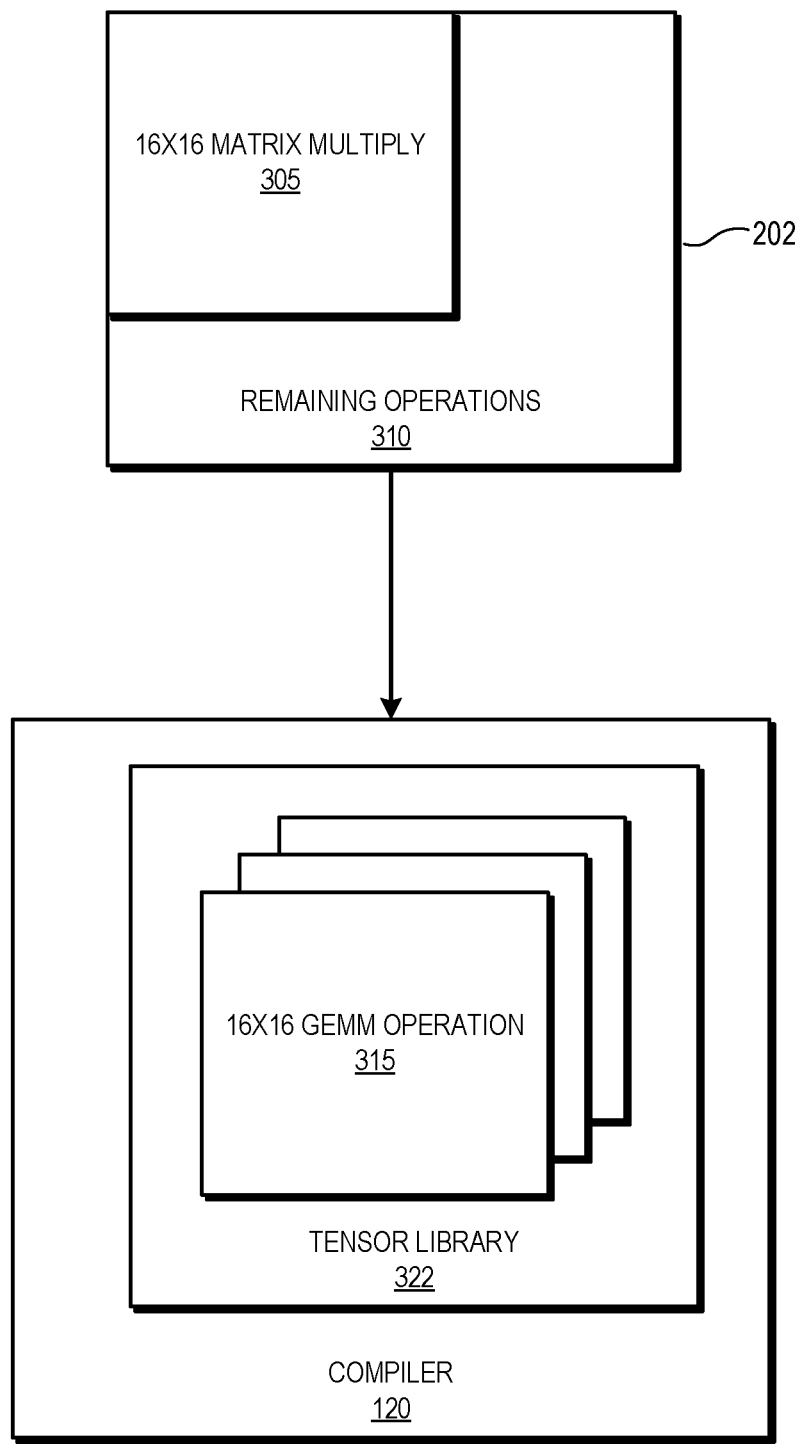
FIG. 3 is a block diagram illustrating identification by the compiler of FIG. 1 of a perfect tile within a loop of source code in accordance with some embodiments.

FIG. 3 is a block diagram illustrating identification by the compiler of FIG. 1 of a perfect tile within a loop of source code in accordance with some embodiments. The compiler 120 includes a tensor library 322 that stores tensor operations executable by the special-purpose hardware accelerator 124. In response to receiving an indication that source code 202 is tileable, the compiler 120 analyzes the inner loops of the source code 202 to determine whether the sequences of instructions of the inner loops match any tensor operations stored at the tensor library 322. In the illustrated example, the tensor library 322 includes a tensor operation that performs a 16×16 general matrix to matrix (GEMM) operation 315. The compiler 120 determines that an inner loop of the source code 202 includes a sequence of instructions to perform a 16×16 matrix multiply operation 305. After confirming that the data type specified by the 16×16 matrix multiply operation 305 matches the data type of the 16×16 GEMM tensor operation 315, the compiler 120 identifies the 16×16 matrix multiply operation 315 as a perfect tile. The compiler 120 identifies the remaining operations 310 of the source code 202 that do not match any tensor operations stored at the tensor library 322 as imperfect tiles.

Thus, for example, given the following user code, where N may not be known at compile time, and where N may not be evenly divisible by 16,

```
#pragma omp tile sizes(16,16,16)
for ( i = 0 ; i < N ; i++ )
  for ( j = 0 ; j <N ; j++ )
    for ( k = 0 ; k < N ; k++ )
      C[i,j] += A[i][k]*B[k][j]
```

Internally, the compiler 120 generates the following equivalent code as a result of a loop tiling transformation:

```
#define TSIZE 16
int rem = N % TSIZE ;
```

```
int last_non_full_block = N;
if (rem)
    last_non_full_block = N – rem;
for ( int ii = 0 ; ii < N ; ii+=TSIZE )
    for ( int jj = 0 ; jj < N ; jj+=TSIZE )
        for ( int kk = 0 ; kk < N ; kk+=TSIZE ) {
            if ((ii == last_non_full_block) ||
                (jj == last_non_full_block) ||
                (kk == last_non_full_block)) {
                /* PARTIAL TILE */
                for ( int i = ii ; i < (min(ii+TSIZE,N)) ; i++ )
                    for ( int j = jj ; j < (min(jj+TSIZE,N)) ; j++ )
                        for ( int k = kk ; k < (min(kk+TSIZE,N)) ; k++ )
                            C[i][j] += A[i][k]*B[k][j];
            } else {
                /* MATRIX MULTIPLY FOR PERFECT TILE OF TSIZExTSIZE */
                for (int i = ii ; i < ii+TSIZE ; i++ )
                    for (int j = jj ; j < jj+TSIZE ; j++ )
                        for (int k = kk ; k < kk+TSIZE ; k++ )
                            C[i][j] += A[i][k]*B[k][j];
            }
        }
```

The compiler 120 then generates enhanced code replacing the matrix multiply instruction for the identified perfect tile (i.e., the non-partial tile) with an equivalent tensor operation denoted by the function "V_MFMA_F32_16X16X16F16_WRAPPER(A, B, C, ii, jj, kk)"

```
#define TSIZE 16
int rem = N % TSIZE ;
int last_non_full_block = N;
if (rem)
    last_non_full_block=N-rem;
for ( int ii = 0 ; ii < N ; ii+=TSIZE )
    for ( int jj = 0 ; jj < N ; jj+=TSIZE )
        for ( int kk = 0 ; kk < N ; kk+=TSIZE ) {
            if ((ii == last_non_full_block) ||
                (jj == last_non_full_block) ||
                (kk == last_non_full_block)) {
                /* PARTIAL TILE */
                for ( int i = ii ; i < (min(ii+TSIZE,N)) ; i++ )
                    for ( int j = jj ; j < (min(jj+TSIZE,N)) ; j++ )
                        for ( int k = kk ; k < (min(kk+TSIZE,N)) ; k++ )
                            C[i][j] += A[i][k]*B[k][j];
            } else {
                V_MFMA_F32_16X16X16F16_WRAPPER(A, B, C, ii, jj, kk);
            }
        }
```

Figure 4:
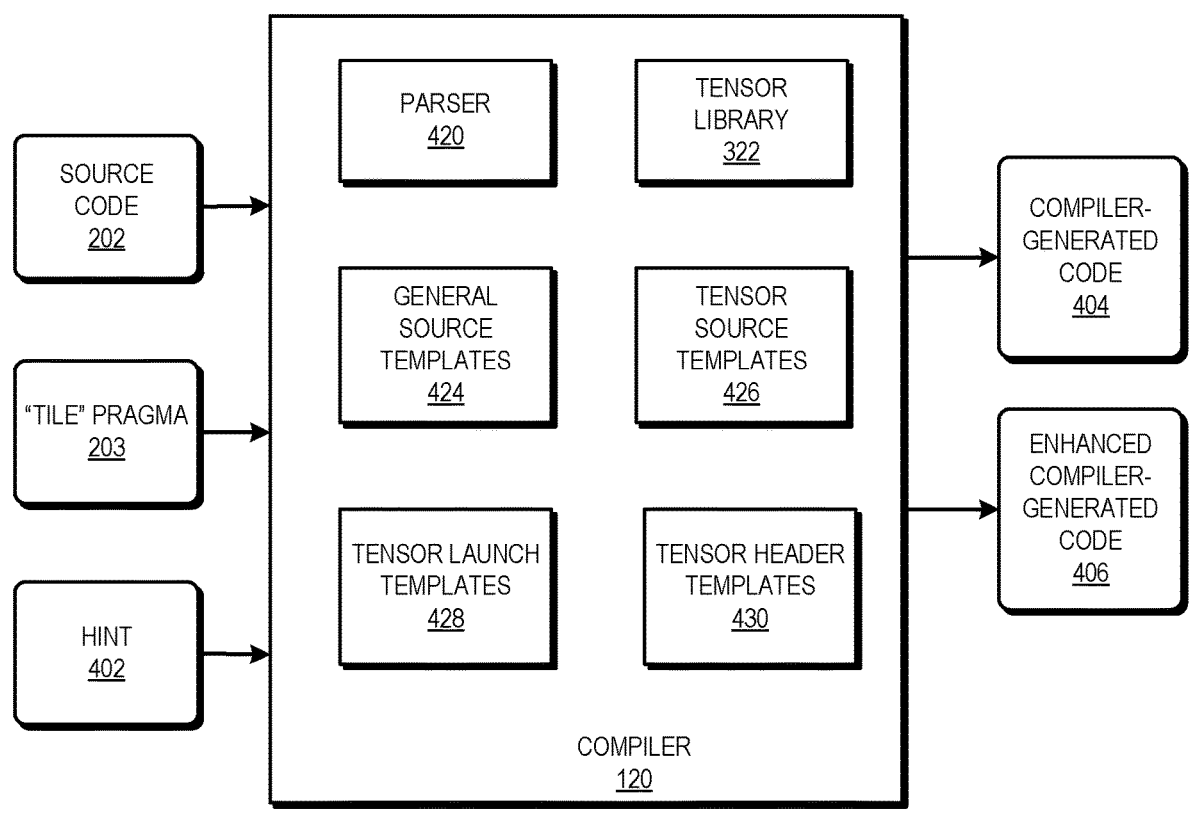
FIG. 4 is a block diagram of the compiler of FIG. 1 in accordance with some embodiments.

FIG. 4 is a block diagram of the compiler of FIG. 1 in accordance with some embodiments. In the depicted example, the compiler 105 includes a parser 420, the tensor library 322, general source templates 424, tensor templates 426, tensor launch templates 428, and tensor header templates 430. The parser 420 is implemented as hard-coded or programmable logic, one or more processors executing software/firmware instructions, or any combination thereof. The parser 420 analyzes strings of symbols in source code 202 to identify function calls for a GPU. In some embodiments the parser 420 can build a data structure (e.g., a parse tree or other hierarchical structure) that indicates the functions calls.

After the parser 420 has generated the functional call data structure and the compiler 120 has received a "tile" pragma 203 in the source code 202 indicating that the source code 202 is tileable, the compiler 120 searches the tensor library 322 to determine whether any tensor operations executable by the special-purpose hardware accelerator 124 match the dimensions and data type of a sequence of instructions of an inner loop of the tileable source code 202. In some embodiments, the source code 202 includes a hint 402 indicating that an inner loop of the source code 202 matches a type of tensor operation of the tensor library 322, for example, "intrinsic(gemm)" to indicate a general matrix to matrix multiplication. If the compiler 120 receives a hint 402 indicating that an inner loop of the source code 202 is replaceable with a type of tensor operation executable by the special-purpose hardware accelerator 124, the compiler 120 searches only a subset of tensor operations corresponding to the type of tensor specified by the hint 402. Thus, in response to receiving the hint 402, the compiler 120 compares the dimensions and data type of the sequence of instructions of the inner loop of the source code 202 with a subset of tensor operations corresponding to the type of tensor operation specified by the hint 402.

The general source templates 424, tensor source templates 426, tensor launch templates 428, and tensor header templates 430 store source code to generate wrapper code for each tensor identified by the compiler 120. Thus, each of the templates 426, 428, and 430 store pre-prepared text, symbols, or other form of source code that, when compiled, allow a corresponding tensor operation to be executed properly at a special-purpose hardware accelerator 124 associated with the templates.

To illustrate via an example, in some embodiments an inner loop of tileable source code 202 includes a convolution or a general matrix to matrix multiplication (GEMM). For example, an inner loop of tileable source code 202 includes a sequence of instructions to multiply two 16×16 matrices, add the product to a third 16×16 matrix, and store the result in the third matrix using a double precision data type:

$$C[i,j]+=A[ij]*B[kj]$$

The compiler 120 searches the tensor library 322 and determines that the tensor library 322 includes a tensor operation that is an aggregate instruction to perform a general matrix to matrix multiplication matching the dimensions and data type of the sequence of instructions, i.e., determines that the sequence of instructions are a perfect tile. The templates 426, 428, and 430 corresponding to the matching tensor operation store source code that, when compiled and executed, perform these operations to ensure that the special-purpose hardware accelerator 124 return expected results.

Accordingly, by copying the appropriate templates to the wrapper code and compiling that code to be part of enhanced compiler-generated code 306, the compiler 120 ensures that the application file 120 performs as expected by the programmer. Further, the compiler 120 automatically identifies and copies the appropriate templates for each perfect tile of the source code 202. This relieves the programmer from having to learn a low-level programming language to access the special-purpose hardware accelerator 124, reducing overall program time and effort while leveraging the enhanced performance of the special-purpose hardware accelerator 124. This also allows programmers to write this code once. Only implementers of compiler 120 or and tensor library 322 would need to make changes to allow the source code 202 to use future hardware acceleration units. Meanwhile, for those portions of the source code 202 that are not determined to be perfect tiles (i.e., for imperfect, or remainder tiles), the compiler 120 generates compiler-generated code 404 to be executed at the general-purpose processing core 122.

In operation, in response to receiving source code 202 and a "tile" pragma 203, the compiler 120 generates wrapper code for tensor operations to replace sequences of instructions of inner loops of the source code 202 as follows. First, the compiler 120 includes the general source templates 424, a general set of source code required to execute the identified tensors. For example, the general source code can have a list of reusable subroutines and defined data structures needed during execution, and code to check if the special-purpose hardware accelerator 124 are available. This general source code keeps track of previous calls to the function to prevent unnecessary repetition of the accelerator initialization process. Next, for each identified tensor operation the compiler 120 identifies a code template at the tensor source templates 426. Each tensor initialization template includes, for the corresponding tensor, the code required to ensure that the tensor is properly invoked and executed. For example, this template has tensor-specific subroutines and data structures that will be needed for each tensor operation.

If the tensor operation is being called for the first time, this code initializes tensor-specific data structures. This code also tracks if a previous call initialized these data structures to avoid reinitializing the data structures. The compiler 120 copies and customizes the identified tensor source templates to the wrapper code. The compiler 120 copies, from the tensor launch templates 428 to the wrapper code, any source code need to launch the tensor. Finally, the compiler 120 identifies a header for the tensor operation from the tensor header templates 430, and copies the identified header to a header file. The header file is used in the compilation of the enhanced compiler-generated code 406 to ensure that the application uses the correct set of arguments to call the generated wrapper. The format for header files can vary for different types of main source code.

Figure 5:
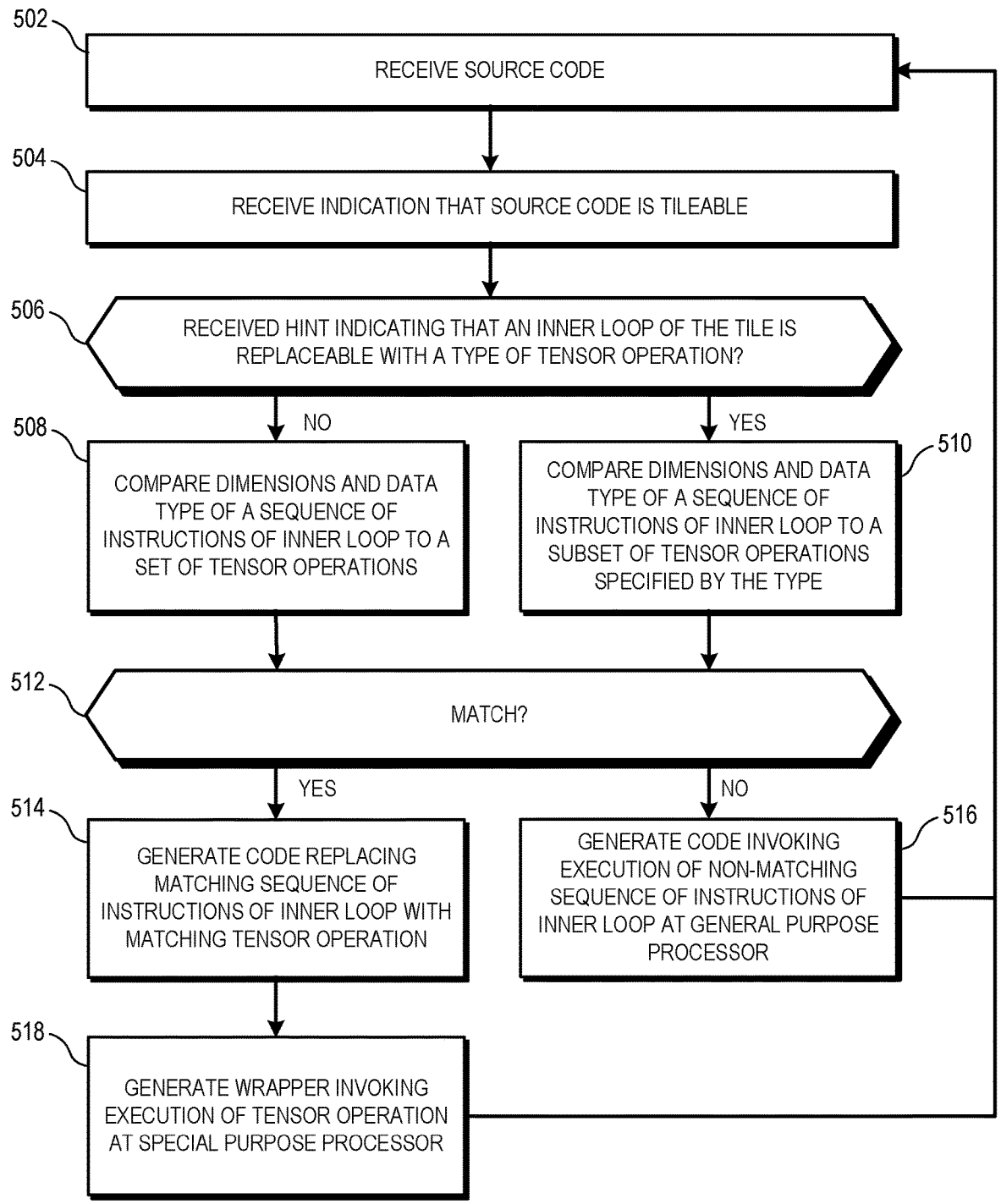
FIG. 5 is a flow diagram illustrating a method for identifying and replacing compiler-generated code for tiles of input source code with tensor operations executable at a special-purpose hardware accelerator in accordance with some embodiments.

FIG. 5 is a flow diagram illustrating a method for identifying and replacing inner loops of tiled source code with tensor operations executable at a special-purpose hardware accelerator of the processing system of FIG. 1 in accordance with some embodiments. At block 502, the compiler 120 receives source code 202. At block 504, the compiler 120 receives an indication such as a tile pragma 203 indicating that the source code 202 is tileable (e.g., "pragma omp tile sizes (16, 16, 16)"). In some embodiments, at block 506, the compiler determines whether it has received a hint 302 indicating that an inner loop of a tile of the source code 202 is replaceable with a type of tensor operation executable at the special-purpose hardware accelerator 124. If, at block 406, the compiler determines that it has not received a hint 402 indicating that an inner loop of a tile of the source code 202 is replaceable with a type of tensor operation executable at a special-purpose hardware accelerator 124, the method flow continues to block 508. At block 508, the compiler 120 compares the dimensions and data type of a sequence of instructions of an inner loop of the source code 202 to a set of tensor operations executable at the special-purpose hardware accelerator 124. The method flow then continues to block 512.

If, at block 506, the compiler determines that it has received a hint 402 indicating that an inner loop of a tile of the source code 202 is replaceable with a type of tensor operation executable at a special-purpose hardware accelerator 124 (e.g., "intrinsic(gemm)"), the method flow continues to block 510. At block 510, the compiler 120 compares the dimensions and data type of a sequence of instructions of an inner loop of a tile of the source code 202 to a subset of tensor operations specified by the type. The method flow then continues to block 512.

At block 512, the compiler 120 determines whether the sequence of instructions of the inner loop of the tile matches a tensor operation of the set of tensor operations stored at the tensor library 322 (in the case of not having received a hint 402 at block 506), or whether the sequence of instructions of the inner loop of the tile matches a tensor operation of a subset of tensor operations corresponding to the type of tensor operation indicated by the hint 402 (in the case of having received the hint 402 at block 506). If, at block 512, the compiler 120 determines that there is a match, the method flow continues to block 514. At block 514, in response to the inner loop of the tile of source code 202 matching a tensor operation executable by the special-purpose hardware accelerator 124 (i.e., identifying a perfect tile), the compiler 120 generates code that replaces the matching sequence of instructions of the inner loop with the matching tensor operation. The method flow then continues to block 518. At block 518, the compiler 120 generates wrapper code to call the matching tensor operation and the matching tensor operation executes at the special-purpose hardware accelerator 124. The method flow then continues back to block 502.

If, at block 512, the compiler 120 determines that there is not a match, or if there are sequences of instructions of the inner loop that do not match (while other sequences of instructions match and therefore form a perfect tile), the non-matching sequences of instructions are identified as "remainder" tiles and the method flow continues to block 516. At block 516, the compiler 120 generates compiler-generated code for the remainder tiles to be executed at the general-purpose processor 122. The method flow then continues back to block 502.

A computer-readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium in some embodiments is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid state storage devices such as Flash memory, a cache, random access memory (RAM) or other non-volatile memory device or devices, and the like. The executable instructions stored on the non-transitory computer-readable storage medium are in source code, assembly language code, object code, or other instruction format that is interpreted or otherwise executable by one or more processors.

Note that not all of the activities or elements described above in the general description are required, that a portion of a specific activity or device are not necessarily required, and that one or more further activities could be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that could cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. A method comprising:
in response to receiving an indication that source code to be compiled at a processing system is tileable such that a tile representing at least one function of the source code performs a memory access to a block of data, determining at a compiler of the processing system whether compiler-generated code comprising a plurality of tiles comprises a sequence of instructions for a tile that can be replaced with a tensor operation executable at a special-purpose hardware accelerator of the processing system; and
generating code that replaces the sequence of instructions of the compiler-generated code with the tensor operation in response to determining that the sequence of instructions can be replaced with the tensor operation.

2. The method of claim 1, further comprising:
generating a wrapper to invoke execution of the tensor operation at a special-purpose hardware accelerator of the processing system.

3. The method of claim 1, wherein generating code comprises:
replacing an inner loop of the tile in response to dimensions and data types of a sequence of instructions of the inner loop matching dimensions and data types of a tensor operation executable by the special-purpose hardware accelerator.

4. The method of claim 1, further comprising:
receiving a hint in the source code indicating that an inner loop of a tile is replaceable with a type of tensor operation; and
in response to receiving the hint and in response to dimensions and data types of the sequence of instructions of the inner loop matching dimensions and a data type of a tensor operation of the type indicated by the hint, generating code replacing the inner loop with the type of tensor operation indicated by the hint.

5. The method of claim 1, further comprising:
identifying as an imperfect tile a sequence of instructions of an inner loop of a tile that does not match dimensions and data types of a tensor operation executable by the special-purpose hardware accelerator.

6. The method of claim 5, further comprising:
generating code to invoke a general-purpose processor of the processing system to execute the imperfect tile.

7. The method of claim 1, wherein the tensor operation is an aggregate instruction comprising a general matrix to matrix multiplication.

8. A method comprising:
responsive to receiving, at a compiler of a processing system, an indication that source code comprises a tile representing one or more functions of the source code that perform a memory access to a block of data, comparing an inner loop of the tile to tensor operations executable by a special-purpose hardware accelerator of the processing system; and
in response to the inner loop of the tile matching a tensor operation executable by the special-purpose hardware accelerator, generating enhanced code that replaces the inner loop of the tile with the tensor operation to invoke the special-purpose hardware accelerator.

9. The method of claim 8, wherein the inner loop comprises a first sequence of instructions that matches dimensions and data types of the tensor operation.

10. The method of claim 9, wherein the tile further comprises a second sequence of instructions that does not match dimensions and data types of the tensor operation.

11. The method of claim 10, further comprising generating code to invoke a general-purpose processor of the processing system to execute the second sequence of instructions.

12. The method of claim 9, further comprising:
receiving a hint in the source code indicating that an inner loop of a tile is replaceable with a type of tensor operation; and generating code replacing the inner loop with the type of tensor operation indicated by the hint.

13. The method of claim 12, wherein comparing comprises:
in response to receiving the hint, comparing dimensions and a data type of the first sequence of instructions with a subset of tensor operations executable by a special-purpose hardware accelerator of the processing system specified by the type of tensor operation indicated by the hint.

14. A processing system comprising:
a special-purpose hardware accelerator; and
a processor configured to:
in response to receiving an indication that compiler-generated code executing at the processing system is tileable, determine whether a portion of the compiler-generated code for a tile comprises a sequence of instructions that can be replaced with a tensor operation;
receive a hint in the compiler-generated code indicating that an inner loop of a tile is replaceable with a type of tensor operation; and
replace the portion of the compiler-generated code with the tensor operation in response to determining that the portion can be replaced with the tensor operation.

15. The processing system of claim 14, wherein the special-purpose hardware accelerator is configured to execute one or more tensor operations.

16. The processing system of claim 15, wherein the processor is further to:
compare dimensions and a data type of the sequence of instructions with tensor operations executable by the special-purpose hardware accelerator; and
replace at least one inner loop in response to the dimensions and data types of the sequence of instructions of the at least one inner loop that match dimensions and data types of a tensor operation executable by the special-purpose hardware accelerator.

17. The processing system of claim 16, wherein the processor is further to:
execute sequences of instructions of the at least one inner loop that do not match dimensions and data types of tensor operations executable by the special-purpose hardware accelerator.

18. The processing system of claim 14, wherein the processor is further configured to:
in response to receiving the hint, compare dimensions and a data type of the sequence of instructions with a subset of tensor operations executable by a special-purpose hardware accelerator of the processing system specified by the type of tensor operation indicated by the hint.

19. The processing system of claim 14, wherein the tensor operation is an aggregate instruction comprising a general matrix to matrix multiplication.

* * * * *